United States Patent
Jenkins

(10) Patent No.: US 10,630,775 B2
(45) Date of Patent: Apr. 21, 2020

(54) MONITORING ASSEMBLY FOR AN INDUSTRIAL CONTROL SYSTEM

(71) Applicant: General Electric Technology GmbH, Baden (CH)

(72) Inventor: Dylan Jenkins, Berlin (DE)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/572,075

(22) PCT Filed: May 5, 2016

(86) PCT No.: PCT/EP2016/060133
§ 371 (c)(1),
(2) Date: Nov. 6, 2017

(87) PCT Pub. No.: WO2016/177855
PCT Pub. Date: Nov. 10, 2016

(65) Prior Publication Data
US 2018/0139283 A1 May 17, 2018

(30) Foreign Application Priority Data
May 6, 2015 (EP) .................................... 15275131

(51) Int. Cl.
*H04L 29/08* (2006.01)
*H04L 12/26* (2006.01)
(Continued)

(52) U.S. Cl.
CPC ............ *H04L 67/12* (2013.01); *G05B 19/042* (2013.01); *H04L 43/10* (2013.01); *H04L 61/103* (2013.01);
(Continued)

(58) Field of Classification Search
CPC ............... G06Q 10/10; G06Q 20/3674; G06Q 20/4014; G06Q 20/4016; G06Q 20/405;
(Continued)

(56) References Cited

U.S. PATENT DOCUMENTS 8,194,680 B1 * 6/2012 Brandwine .......... H04L 61/103
370/398
2002/0019725 A1 2/2002 Petite
(Continued)

FOREIGN PATENT DOCUMENTS

WO 2008/076234 A1 6/2008

OTHER PUBLICATIONS

Extended European Search Report and Opinion issued in connection with corresponding EP Application No. 15275131.9 dated Nov. 4, 2015.
(Continued)

*Primary Examiner* — Dionne Pendleton
(74) *Attorney, Agent, or Firm* — Eversheds Sutherland (US) LLP

(57) ABSTRACT

An industrial control systems to control industrial processes and production, there is provided a monitoring assembly for such an industrial control system. The monitoring assembly comprises an industrial control system that includes a communications device which is connectable to a communications network and which is configured to attempt to send a request via the communications network to an internet address. The monitoring assembly also includes a monitoring apparatus that is configured to detect communication of the communications device with the internet address and following such detection provide an alarm notification including an indication that the industrial control system is connected to the Internet.

8 Claims, 2 Drawing Sheets

(51) Int. Cl.
*H04L 29/12* (2006.01)
*G05B 19/042* (2006.01)
*H04L 29/06* (2006.01)

(52) U.S. Cl.
CPC .......... *H04L 61/1511* (2013.01); *H04L 63/02* (2013.01); *H04L 63/04* (2013.01); *H04L 63/14* (2013.01); *H04L 63/16* (2013.01); *H04L 63/30* (2013.01)

(58) Field of Classification Search
CPC .. G06Q 2230/00; G06Q 40/02; G06Q 50/265; G06Q 30/02; G06Q 20/3829; G07C 13/00; H04L 63/08; H04L 43/10; H04L 61/103; H04L 61/1511; H04L 67/12; H04L 41/0816; H04L 41/50; H04L 43/16; H04L 61/251; H04L 67/06; H04L 69/167; H04L 29/12028; H04L 29/12216; H04L 29/12264; H04L 41/069; H04L 41/0806; H04L 41/0809; H04L 41/0873; H04L 41/0886; H04L 43/028; H04L 43/04; H04L 43/0829; H04L 47/32; H04L 61/2007; H04L 61/2046; H04L 63/0236; H04L 63/0272; G05B 19/042; G01R 22/00; G01R 31/374; G01R 31/3842; G01R 31/385; G01R 31/006; G01R 1/203; G01R 31/007; G01R 31/364; G01R 31/3647; G01R 31/3648; G06F 9/45533; H04B 17/309; H04W 4/02; H04W 80/045; H04W 40/248; H04W 52/0254; H04W 88/02; B60R 16/023; G01D 4/002; G08B 21/16; G08B 25/10; H02J 7/0004; H02J 7/0008; H02J 7/008; H02J 7/14; H02J 7/163; H02M 2001/0009; H04Q 9/00; H05K 1/0263; H05K 2201/10022; H05K 2201/10272; H05K 2201/10848; H05K 3/222; H05K 3/308; H05K 3/3447; Y02D 70/16; Y02D 70/168; Y02D 70/26; Y02T 10/7005; Y02T 29/49133; Y02T 29/49114; Y02T 29/53135

See application file for complete search history.

(56) References Cited

U.S. PATENT DOCUMENTS

| | | | |
|---|---|---|---|
| 2004/0024483 A1* | 2/2004 | Holcombe | G06Q 30/02 700/122 |
| 2006/0031472 A1 | 2/2006 | Rajavelu et al. | |
| 2010/0138550 A1* | 6/2010 | Lee | H04L 29/12216 709/228 |
| 2016/0125412 A1* | 5/2016 | Cannon | G06Q 20/4014 705/44 |
| 2016/0269380 A1* | 9/2016 | Kishida | H04L 63/08 |

OTHER PUBLICATIONS

International Search Report and Written Opinion issued in connection with corresponding PCT Application No. PCT/EP2016/060133 dated Aug. 17, 2016.

* cited by examiner

MONITORING ASSEMBLY FOR AN INDUSTRIAL CONTROL SYSTEM

FIELD OF INVENTION

This invention relates to a monitoring assembly for an industrial control system.

BACKGROUND OF THE INVENTION

Industrial control systems, such as Supervisory Control and Data Acquisition (SCADA) systems, are used to control industrial processes and production. Examples include the control of critical functions at power plants and water treatment facilities to the operation of assembly lines at food processing and vehicle assembly plants.

A particular type of industrial control system, namely that including one or more Intelligent Electronic Devices (IEDs), (e.g., programmable microcontrollers), is often installed in electrical power systems such as those that arise in connection with the generation, transmission and distribution of electricity or in other transport or industrial systems.

In such cases the or each IED is typically sited in an electrical substation and is arranged to measure, protect, control and monitor the electrical power system to which it or they are connected.

BRIEF DESCRIPTION OF THE INVENTION

According to an aspect of the invention there is provided a monitoring assembly for an industrial control system comprising: an industrial control system including a communications device connectable to a communications network and configured to attempt to send a request via the communications network to an internet address; and a monitoring apparatus configured to detect communication of the communications device with the internet address and following such detection provide an alarm notification including an indication that the industrial control system is connected to the Internet.

The inclusion of a monitoring apparatus which is able to provide an alarm notification that includes an indication that a given industrial control system is connected to the Internet is desirable because industrial control systems that are connected to the Internet, i.e. an open, public network, are exposed to a risk of being compromised, (e.g., by a cyber attack).

Moreover, such an alarm notification is provided automatically without the need for any prior configuration or subsequent intervention by the owner of an industrial asset being controlled by a particular industrial control system.

In addition, the provision of a monitoring apparatus that detects when such a connection to the Internet has arisen avoids the need for the industrial asset owner to manually check that the industrial control system remains isolated from the Internet. This is particularly advantageous as it does away with the need for the industrial asset owner to commission and maintain separate equipment to manually check for connection to the Internet, such separate equipment needing to be updated each time the configuration of a particular industrial control system is changed or further industrial control systems are added to a given segregated, i.e. private, network.

Moreover, although the suppliers of industrial control systems typically stipulate that such systems should remain on a segregated network in order to maintain cyber security, a particular industrial control system may inadvertently become connected to the Internet, (e.g., when maintenance is carried out), or may intentionally be connected to the Internet, (e.g., in an attempt to provide easier assess thereto in an emergency situation), and so it is beneficial to be alerted when such connection takes place so as to be aware of the risk of a particular industrial asset being compromised.

Indeed, in the latter regard the danger of inadvertent or intentional connection of an industrial control system to the Internet is likely only to increase as remote access to such industrial control systems is needed more and more, with the provision of such remote access often requiring a secure link between an industrial asset owner's corporate network (that is almost always connected to the Internet) and the segregated, private network to which the industrial control system is connected.

In an embodiment of the invention the monitoring apparatus includes a first monitoring submodule configured to detect communication of the communications device with the internet by detecting receipt of a response from the internet address to the request.

Such an arrangement provides a reliable and repeatable way of detecting connection of the industrial control system with the Internet, and in a manner that can, if needed, be localised to a particular industrial control system of interest without the need for any extraneous equipment.

In the embodiment, the first monitoring submodule is located within the industrial control system.

Locating the first monitoring submodule within the industrial control system provides for a self-contained arrangement, the configuration and subsequent operation of which can be readily established by the supplier of the associated monitoring assembly.

Optionally the first monitoring submodule is configured to provide an alarm notification within the industrial control system.

Having the first monitoring submodule provide an alarm notification within the industrial control system usefully alerts a control or maintenance operative within the facility in which the associated industrial asset being controlled is located, (e.g., within an electrical substation), that a given industrial control system is connected to the Internet and is therefore at risk of being compromised.

The monitoring apparatus may include a second monitoring submodule configured to detect communication of the communications device with the internet address by detecting receipt of the request.

The inclusion of such a second monitoring submodule, i.e. one configured to detect communication of the communications device with the internet address by detecting receipt of the request, permits the location of the second monitoring submodule to be remote from the industrial control system and associated industrial asset being controlled. This provides for more convenient administration of the second monitoring submodule, e.g., by the supplier of the monitoring assembly. It additionally provides the option of having a single second monitoring submodule monitor and detect whether an Internet connection arises in respect of a number of separate and operationally distinct industrial control systems which could potentially belong to different industrial asset owners.

A monitoring assembly according to an embodiment of the invention further includes a fixed internet server which defines the internet address.

The inclusion within the monitoring assembly of a fixed internet server improves the robustness of the monitoring assembly by helping to ensure that an internet address is always available for Internet connection detection purposes.

In addition, it affords the option of providing further functionality, (e.g., in terms of notification of an industrial asset owner), within the monitoring assembly.

In the embodiment, the second monitoring submodule is located within the fixed internet server.

Having the second monitoring submodule so located desirably permits it to act to detect communication of the communications device of an industrial control system with the Internet by detecting receipt of a corresponding request from the communications device. Such positioning also assists in maintaining a desirable degree of operational control over the second monitoring submodule, e.g., by the supplier of the monitoring assembly.

Optionally the first monitoring submodule is configured to communicate the alarm notification to the fixed internet server.

The inclusion of a first monitoring submodule so configured desirably permits wider dissemination of the alarm notification to interested parties.

The fixed internet server may be configured to identify the owner of the industrial control system indicated as being connected to the Internet and to notify the owner of the said industrial control system that the said industrial control system is so connected.

Such functionality is desirable since it provides automatic notification to a given industrial asset owner that remedial action is needed in relation to the industrial control system of a particular asset in order to mitigate the risk of the said industrial control system becoming compromised.

In the embodiment, the fixed internet server is configured to identify the owner of the industrial control system indicated as being connected to the Internet based on information provided to it by the communications device of the said industrial control system.

Having the fixed internet server so configured helps to ensure the rapid and correct identification of a particular industrial asset owner, and thereby the timely notification of such an owner of an issue with a given industrial control system.

In an embodiment of the invention the communications device is configured to attempt to send a first request via the communications network to a first internet address and a second request via the communications network to a second internet address, and the monitoring apparatus is configured to detect communication of the communications device with either of the first and second internet addresses and following such detection provide the alarm notification.

The inclusion of a communications device that is configured to attempt to send first and second requests, and of a monitoring apparatus configured to detect communication of the communications device with either of the first and second internet addresses to which the respective requests are sent, provides a degree of redundancy within the monitoring assembly whereby connection of the industrial control system to the Internet can still be detected even if one of the internet addresses is temporarily unavailable, (e.g., is temporarily off-line).

BRIEF DESCRIPTION OF THE DRAWINGS

There now follows a brief description of embodiments of the invention, by way of non-limiting example, with reference being made to the following drawings in which.

DETAILED DESCRIPTION OF THE INVENTION

Figure 1:
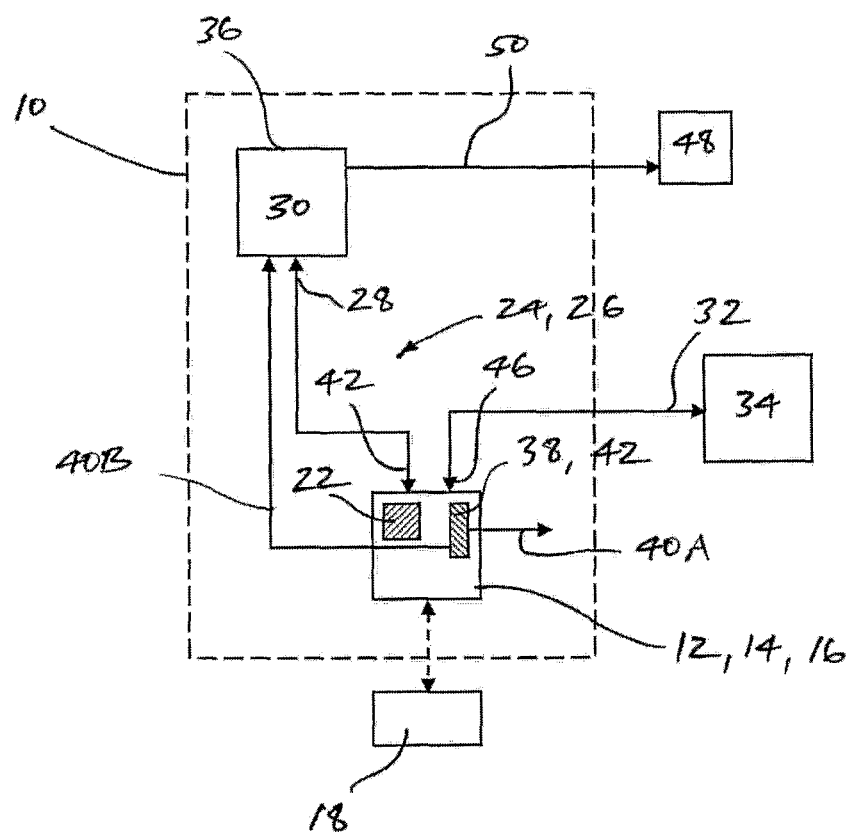
FIG. 1 shows a schematic view of a monitoring assembly.

A monitoring assembly according to a first embodiment of in an embodiment designated generally by reference numeral 10, as shown in FIG. 1.

The monitoring assembly 10 includes an industrial control system 12 which, in the embodiment shown, is an Intelligent Electronic Device (IED) 14 and more particularly is a programmable microcontroller 16, although other types of controllers are also possible.

The industrial control system 12, i.e. the IED 14, measures, protects, controls and monitors an electrical power system 18 with which it is operatively connected.

The IED 14 includes a communications device 22 such as, e.g., an Ethernet module, that is connectable to a communications network 24 which, in the embodiment shown, is the Internet 26.

The communications device 22 is configured to attempt to send a request, via the communications network 24, i.e. via the Internet 26, to an internet address. More particularly, the communications device 22 is configured to attempt to send a first request 28 to a first internet address 30 and to attempt to send a second request 32 to a second internet address 34. In each instance the respective attempted request 28, 32 is a ping request although other types of requests can also be made.

In addition, the communications device 22 is configured to attempt sending the first and second requests 28, 32 at periodic intervals of, say, 1 hour. More or less frequent first and second requests 28, 32 may be made however.

In the embodiment shown in FIG. 1, the first internet address 30 is defined by a fixed internet server 36, i.e. an internet server with a fixed Internet Protocol (IP) address or an internet domain name, which itself forms a part of the first monitoring assembly 10. In embodiments of the invention the fixed internet server 36 need not form a part of the monitoring assembly as a whole.

Meanwhile, the second internet address 34 is defined by a well-known internet address that is extremely unlikely to change over time. One example of such a well-known, unchanging internet address is www.google.com (IP address: 74.125.136.113), although others may also be used.

In embodiments of the invention the communications device 22 may be configured to attempt to send only a first request to a first internet address which may be defined by a fixed internet server or a well-known internet address.

In addition to the foregoing, the first monitoring assembly 10 also includes a monitoring apparatus 38 that is configured to detect communication of the communications device 22 with either the first internet address 30 or the second internet address 34 and, following such detection, to provide an alarm notification 40A, 40B which includes an indication that the industrial control system 12, i.e. the IED 14, is connected to the Internet 26.

More particularly, the monitoring apparatus 38 includes a first monitoring submodule 42 that is configured to detect communication of the communications device 22 with the Internet 26 by detecting receipt of a corresponding first or second response 44, 46 from either the first internet address 30, i.e. the fixed internet server 36, or the second internet address 34, i.e. the well-known internet address.

The first monitoring submodule 42 is located within the industrial control system 12, i.e. within the IED 14, and is configured to provide a first alarm notification 40A within the industrial control system 12. The first alarm notification 40A may take the form of a visible or audible alarm, such that a control or maintenance operative within the facility housing the associated electrical power system 18 becomes aware of the first alarm notification 40A. Additionally or alternatively the first alarm notification 40A may be transmitted electronically to a remote control system management facility using, for example, a Supervisory Control and Data Acquisition (SCADA) protocol.

In addition, the first monitoring submodule 42 is further configured to communicate the alarm notification, i.e. in the form of a second alarm notification 40B, to the fixed internet server 36. The second alarm notification 40B may be dispatched via the same communications network 24 as the first request 28, i.e. via the Internet 26.

On receipt of the aforementioned second alarm notification 40B, the fixed internet server 36 is configured to identify the owner 48 of the industrial control system 12, i.e. the owner 48 of the industrial asset, (e.g., electrical power system 18), operatively connected with the industrial control system 12 that is indicated as being connected to the Internet 26.

In the embodiment shown, the fixed internet server 36 is configured to identify the owner 48 based on information provided by the communications device 22 of the compromised industrial control system 12. More particularly, the communications device 22 provides model information relating to the industrial control system 12 which includes, details of the owner 48, such that the fixed internet server 36 is able directly to identify the owner 48.

In embodiments of the invention (not shown) the fixed internet server 36 may instead make use of the media access control (MAC) address, i.e. the unique identifier assigned to the communications device 22, together with a cross-referenced database of supplied monitoring assemblies 10 and corresponding owners, to identify the owner.

The fixed internet server 36 is still further configured to notify the identified owner 48 that the industrial control system 12 of interest, and hence the associated electrical power system 18, is connected to the Internet 26 such that it is at risk of being compromised from a cyber security perspective.

In this regard the owner 48 can be asked when the monitoring assembly 10 is supplied to nominate a designated contact person, and thereafter the fixed internet server 36 can be arranged to send an alert 50 to the designated contact person, (e.g., in the form of an e-mail or a text message using a Short Message Service (SMS)), to notify the said contact person that the given industrial asset is connected to the Internet 26.

Figure 2:
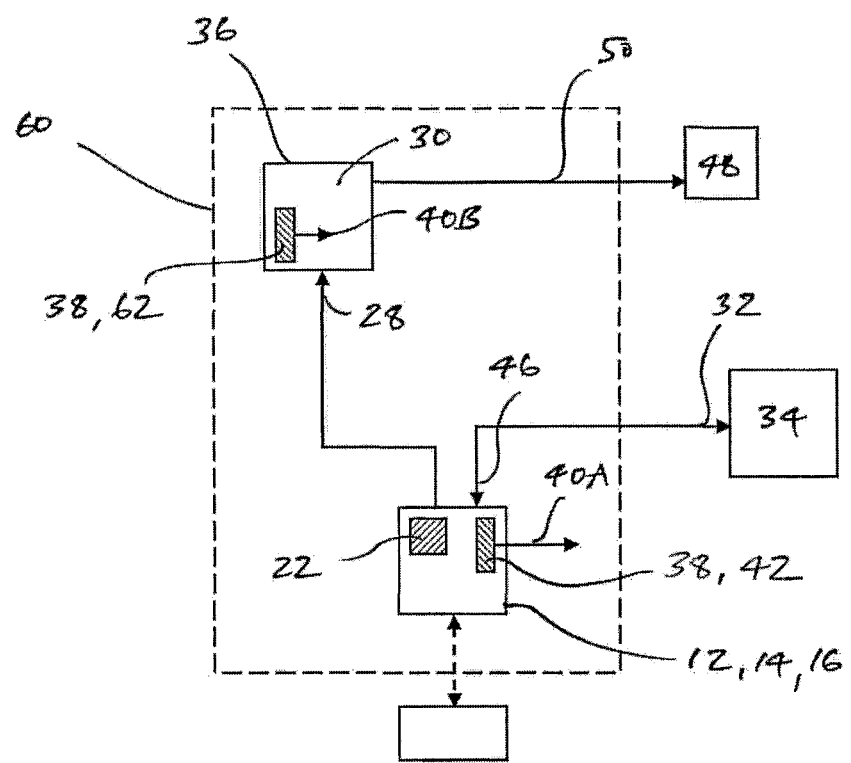
FIG. 2 shows a schematic view of a monitoring assembly.

A monitoring assembly according to a second embodiment in the embodiment designated generally by reference numeral 60, as shown in FIG. 2. The second monitoring assembly 60 is similar to the first monitoring assembly 10 and like features share the same reference numerals.

In this regard the second monitoring assembly 60 again includes an industrial control system 12 in the form of an Intelligent Electronic Device (IED) 14, although other types of controller are also possible.

The industrial control system 12, i.e. the IED 14, again measures, protects, controls and monitors an electrical power system 18 with which it is operatively connected.

The IED 14 of the second monitoring assembly 60 similarly includes a communications device 22 that is connectable to a communications network 24 in the form of the Internet 26.

The communications device 22 is again configured to attempt to send a first request 28 to a first internet address 30 and to attempt to send a second request 32 to a second internet address 34. In each instance the respective attempted request 28, 32 is a ping request, although other types of request can also be made. Such requests 28, 32 are again made at periodic intervals of 1 hour, although more or less frequent first and second requests 28, 32 may be made.

The first internet address 30 is again defined by a fixed internet server 36 which itself forms a part of the second monitoring assembly 60.

In the meantime the second internet address 34 is again defined by a well-known internet address, (e.g., www.google.com (IP address: 74.125.136.113)), although others may also be used.

In embodiments of the invention the communications device 22 may be configured to attempt to send only a first request to a first internet address which is defined by a fixed internet server that forms a part of the monitoring assembly.

The second monitoring assembly 60 again additionally includes a monitoring apparatus 38 that is configured to detect communication of the communications device 22 with either the first internet address 30 or the second internet address 34.

More particularly, the monitoring apparatus 38 of the second monitoring assembly 60 again includes a first monitoring submodule 42 that is configured to detect communication of the communications device 22 with the Internet 26 by detecting receipt of a second response 46 from the second internet address 34, i.e. the well-known internet address. The first monitoring submodule 42 is located within the industrial control system 12, i.e. within the IED 14, and is configured to provide a first alarm notification 40A within the industrial control system 12. The first alarm notification 40A may take the form of a visible or audible alarm, such that a control or maintenance operative within the facility housing the associated electrical power system 18 becomes aware of the first alarm notification 40A. Additionally or alternatively the first alarm notification 40A may be transmitted electronically to a remote control system management facility using, for example, a Supervisory Control and Data Acquisition (SCADA) protocol.

In embodiments of the invention in which the communications device 22 is configured to attempt to send only a first request to a first internet address which is defined by a fixed internet server that forms a part of the monitoring assembly, i.e. the communications device 22 is not configured to send a request to some other, (e.g., well-known, internet address), the monitoring apparatus 38 may omit the first monitoring sub-module 42.

Returning to the second monitoring assembly 60 shown in FIG. 2, the monitoring apparatus 38 additionally includes a second monitoring submodule 62 that is configured to detect communication of the communications device 22 with the first internet address 30 by detecting receipt of the first request 28.

The second monitoring submodule 62 is therefore, in the embodiment shown, located within the fixed internet server 36.

In addition the second monitoring submodule 62 is configured to provide a second alarm notification 40B, in the form of an internal message to the fixed internet server 36, with the second alarm notification 40B including an indication that the industrial control system 12, i.e. the IED 14, is connected to the Internet 26.

On receipt of the aforementioned second alarm notification 40B, the fixed internet server 36 is again similarly configured to identify the owner 48 of the industrial control system 12, i.e. the owner 48 of the electrical power system 18 operatively connected with the industrial control system 12 that is indicated as being connected to the Internet 26.

In the embodiment shown, the fixed internet server 36 is configured to identify the owner 48 based on information provided by the communications device 22 of the compromised industrial control system 12, and more particularly by making use of the media access control (MAC) address received by the second monitoring submodule 62 along with the first request 28. The fixed internet server 36 again cross-references the MAC address with a database of supplied monitoring assemblies 10 and corresponding owners 48.

The fixed internet server 36 is again configured to send an alert 50 to the designated contact person of the owner 48 to notify the said contact person that the given industrial asset, i.e. the electrical power system 18, is connected to the Internet 26.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A monitoring assembly for an industrial control system comprising:
    an industrial control system that controls an electrical power system, the industrial control system including a communications device connectable to a communications network and configured to attempt to send a request via the communications network to an internet address defined by a fixed internet server; and
    a monitoring apparatus configured to detect communication of the communications device with the internet address and following such detection provide an alarm notification including an indication that the industrial control system is connected to the Internet, wherein the monitoring apparatus includes a second monitoring submodule which is located within the fixed internet server and configured to detect communication of the communications device with the internet address by detecting receipt of the request.

2. The monitoring assembly according to claim 1 wherein the monitoring apparatus includes a first monitoring submodule configured to detect communication of the communications device with the internet by detecting receipt of a response from the internet address to the request.

3. The monitoring assembly according to claim 2 wherein the first monitoring submodule is located within the industrial control system.

4. The monitoring assembly according to claim 2 wherein the first monitoring submodule is configured to provide an alarm notification within the industrial control system.

5. The monitoring assembly according to claim 2, wherein the first monitoring submodule is configured to communicate the alarm notification to the fixed internet server.

6. The monitoring assembly according to claim 1 wherein the fixed internet server is configured to identify the owner of the industrial control system indicated as being connected to the Internet and to notify the owner of the said industrial control system that the said industrial control system is so connected.

7. The monitoring assembly according to claim 6 wherein the fixed internet server is configured to identify the owner of the industrial control system indicated as being connected to the Internet based on information provided to it by the communications device of the said industrial control system.

8. A monitoring assembly according to claim 1 wherein the communications device is configured to attempt to send a first request via the communications network to a first internet address and a second request via the communications network to a second internet address, and the monitoring apparatus is configured to detect communication of the communications device with either of the first and second internet addresses and following such detection provide the alarm notification.

* * * * *